United States Patent
Baloga

[11] Patent Number: 6,068,433
[45] Date of Patent: May 30, 2000

[54] ADJUSTABLE CARGO BAR ASSEMBLY

[76] Inventor: Edward L. Baloga, 7001 Plainfield Ave., Cleveland, Ohio 44144

[21] Appl. No.: 09/206,580

[22] Filed: Dec. 7, 1998

Related U.S. Application Data

[60] Provisional application No. 60/069,585, Dec. 12, 1997.

[51] Int. Cl.$^7$ .................................................. B60P 7/15
[52] U.S. Cl. .......................... 410/145; 410/121; 410/143; 410/155; 410/122
[58] Field of Search ................................. 410/143, 144, 410/145, 146, 148, 121, 151, 155, 122, 127–129; 211/105.3; 248/354.1, 354.5, 354.6; 224/551, 552

[56] References Cited

U.S. PATENT DOCUMENTS

| | | | |
|---|---|---|---|
| 1,506,462 | 8/1924 | Thompson | 410/128 |
| 1,753,400 | 4/1930 | Bryson | 410/128 |
| 1,891,588 | 12/1932 | Claus | 410/151 |
| 2,857,856 | 10/1958 | Cronin . | |
| 2,908,474 | 10/1959 | Chiarito . | |
| 3,602,372 | 8/1971 | Verrecchio | 211/105.3 |
| 4,010,848 | 3/1977 | Pater et al. | 410/128 X |
| 4,343,578 | 8/1982 | Barnes | 410/151 |
| 4,492,499 | 1/1985 | Gasper | 410/143 X |
| 4,650,383 | 3/1987 | Hoff | 410/149 |
| 4,737,056 | 4/1988 | Hunt | 410/151 |
| 4,770,579 | 9/1988 | Aksamit | 410/121 X |
| 4,772,165 | 9/1988 | Bartkus | 410/145 X |
| 4,824,702 | 4/1989 | Schultheis et al. | 410/151 |
| 5,028,185 | 7/1991 | Shannon | 410/151 |
| 5,104,269 | 4/1992 | Hardison | 410/145 X |
| 5,351,926 | 10/1994 | Moses | 248/354.5 |
| 5,427,487 | 6/1995 | Brosfske | 410/121 |
| 5,433,566 | 7/1995 | Bradley | 410/121 |
| 5,509,764 | 4/1996 | Shives | 410/150 |
| 5,697,742 | 12/1997 | House | 410/127 |
| 5,807,047 | 9/1998 | Cox | 410/143 X |

FOREIGN PATENT DOCUMENTS 547064A  10/1957  Canada ................................. 224/552

OTHER PUBLICATIONS

Kinedyne Corporation, Cargo Control Systems Catalog, Catalog No. CC196, Copyright 1996, 3 pages.

*Primary Examiner*—Stephen T. Gordon
*Attorney, Agent, or Firm*—Pearne, Gordon, McCoy & Granger LLP

[57] ABSTRACT

An adjustable cargo retention bar assembly for securing cargo within a cargo hold. The assembly includes a rigid beam having a rod inserted through the beam. The rod is movably adjustable with respect to the beam and is provided with a surface for contacting and securing the cargo. The assembly also provides a stop to prevent the rod from moving once the surface is positioned against the cargo.

6 Claims, 2 Drawing Sheets

ADJUSTABLE CARGO BAR ASSEMBLY

This application claims the benefit of U.S. Provisional Application No. 60/069,585 filed Dec. 12, 1997.

BACKGROUND OF THE INVENTION

The present invention relates to cargo control devices and methods of assembling the devices. More specifically, the invention relates to a cargo retention bar assembly having an adjustable cargo brace. The present invention also contemplates a method for attaching the adjustable brace on an existing retention bar.

When transporting cargo in the cargo hold of a truck, train car or the like, it is important to keep the cargo load from shifting. Shifting cargo can damage the cargo itself or the transportation vessel. Shifting cargo can also rapidly change the center of gravity of the transportation vessel leading to a serious accident. There are a number of devices presently employed for the purpose of cargo control. These devices include, for example, rope, adjustable straps, nets, and elastic cords having hooks.

Cargo control devices also include shoring beams (i.e., rigid beams used to brace the load). These beams, or retention bars, are typically made out of a hollow aluminum bar having a square-shaped cross section. Both ends of the retention bars are usually equipped with a bar end assembly. The bar end assembly consists of a channel assembly secured to the end of the retention bar and a spring biased keeper. For use in conjunction with such a retention bar assembly, the sides of the cargo hold are provided with horizontal tracks having a series of spaced apart slot-like openings. The channel assemblies are provided with catches for engaging the slot-like openings. The keepers help lock the retention bar assembly in place. Once in place, the retention bar assembly helps to prevent or minimize shifting of the cargo.

However, the positioning of the retention bar is dictated by the positions of the slot-like openings. For irregularly shaped items, items positioned between adjacent slot-like openings or unevenly distributed items, there may be a gap between the cargo and retention bar. Many cargo loads, therefore, are not properly secured. Thus, there is a need in the art for way to better secure these types of loads.

SUMMARY OF THE INVENTION

The present invention provides a way to secure irregularly shaped items, items positioned between adjacent slot-like openings and unevenly distributed items by providing a cargo retention bar assembly having an adjustable cargo brace.

The present invention provides an adjustable cargo retention bar assembly made from a rigid beam defining a passageway. A rod, which has a surface for securing the cargo load, is inserted through the passageway. A means for preventing movement of the rod in relationship with the beam is also provided.

According to another aspect of the invention, the beam is hollow and a support is secured inside the beam. The support also has a hollow section that is aligned with the beam passageway.

According to another aspect of the invention, the rod is threaded and is held to the beam with stop nuts.

According to another aspect of the invention, the hollow section of the support is threaded to engage the threads of the rod.

The present invention also contemplates a method for attaching the adjustable brace on the retention bar. The method includes the steps of removing a bar end assembly from the beam, drilling a hole through the beam to define the passageway, and inserting the support into the beam so the hollow section of the support is aligned with the beam passageway. Next, the support is secured to the beam and the rod is threadably inserted through the passageway and the hollow section. Finally, the bar end assembly is replaced.

BRIEF DESCRIPTION OF THE DRAWING

These and further features of the present invention will be apparent with reference to the following description and drawings, wherein.

DETAILED DESCRIPTION OF THE INVENTION

Figure 1:
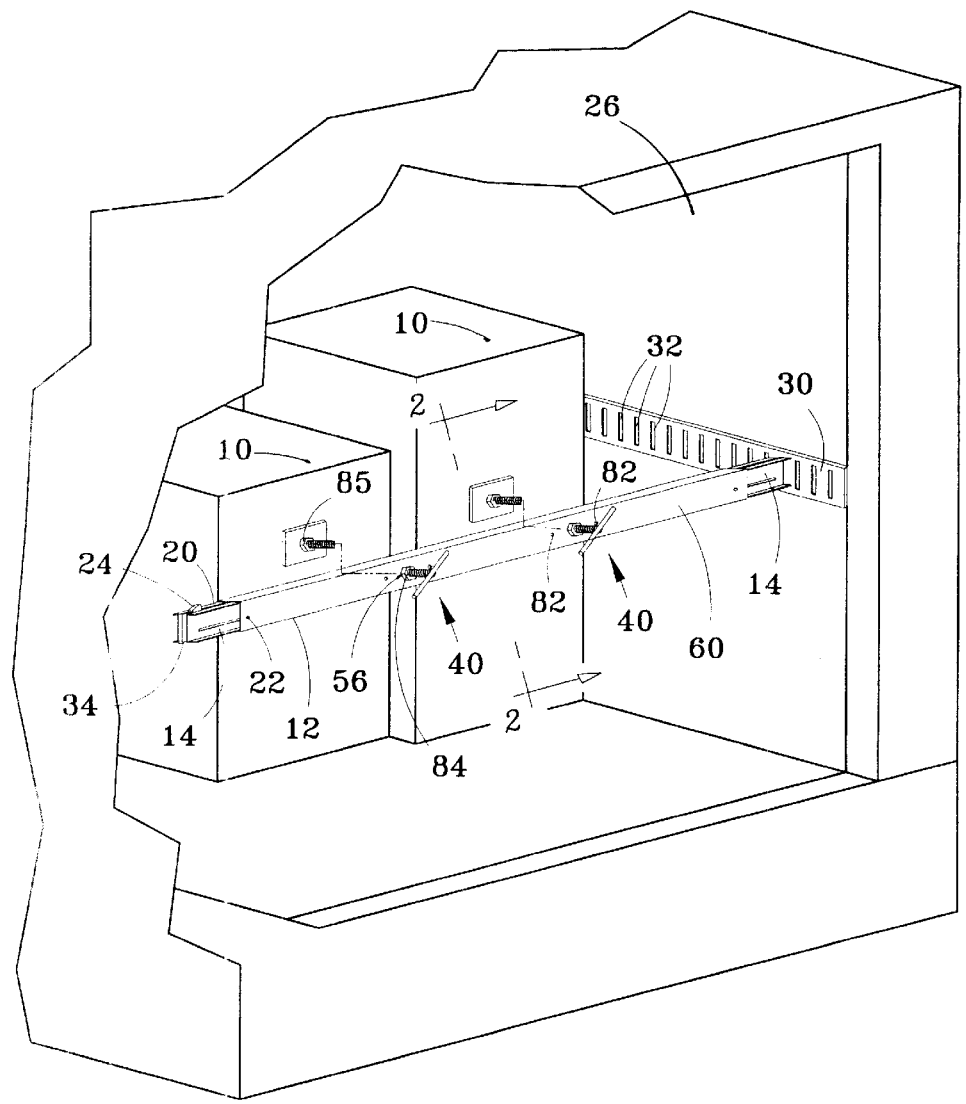
FIG. 1 is a front perspective view of a retention bar having bar end assemblies and an adjustable brace shown in use in a cargo hold that is partially broken away.

In the detailed description which follows, identical components have been given the same reference numerals, and, in order to clearly and concisely illustrate the present invention, certain features may be shown in somewhat schematic form.

Referring to FIG. 1, cargo 10 is often prevented from shifting by using a rigid beam or retention bar 12 to brace the load 10. The retention bar 12 is typically made out of a hollow aluminum bar having a square-shaped or rectangular-shaped cross section. Both ends of the retention bar 12 are usually equipped with a bar end assembly 14. The bar end assembly 14 has a channel assembly 20 slid into the end of the retention bar 12 and secured by a pin or bolt 22. The bar end assembly 14 also has a spring biased keeper 24.

For use in conjunction with such a retention bar 12, the sides of a cargo hold 26 are provided with horizontal tracks 30 having a series of spaced apart slot-like openings 32. The channel assemblies 22 are provided with catches 34 for engaging the openings 32. The keepers 24 help lock the retention bar 12 in place. Once in place, the retention bar 12 helps to prevent shifting of the cargo 10. The retention bar 12 and tracks 30, as described above, are generally conventional and known in the art.

The positioning of the retention bar 12 is dictated by the positions of the openings 32. For irregularly shaped items, items positioned between the openings 32 or unevenly distributed items, there may be a gap between the cargo 10 and retention bar 12. It is this last example, unevenly distributed cargo 10, which is depicted in FIG. 1. Many cargo loads, therefore, are not properly secured. Thus, there is a need in the art for a way to secure these types of loads.

The present invention provides a means to secure loads that are normally not adequately secured by a rigid beam alone. The present invention provides a cargo retention bar 12 having an adjustable cargo brace assembly 40.

Figure 2:
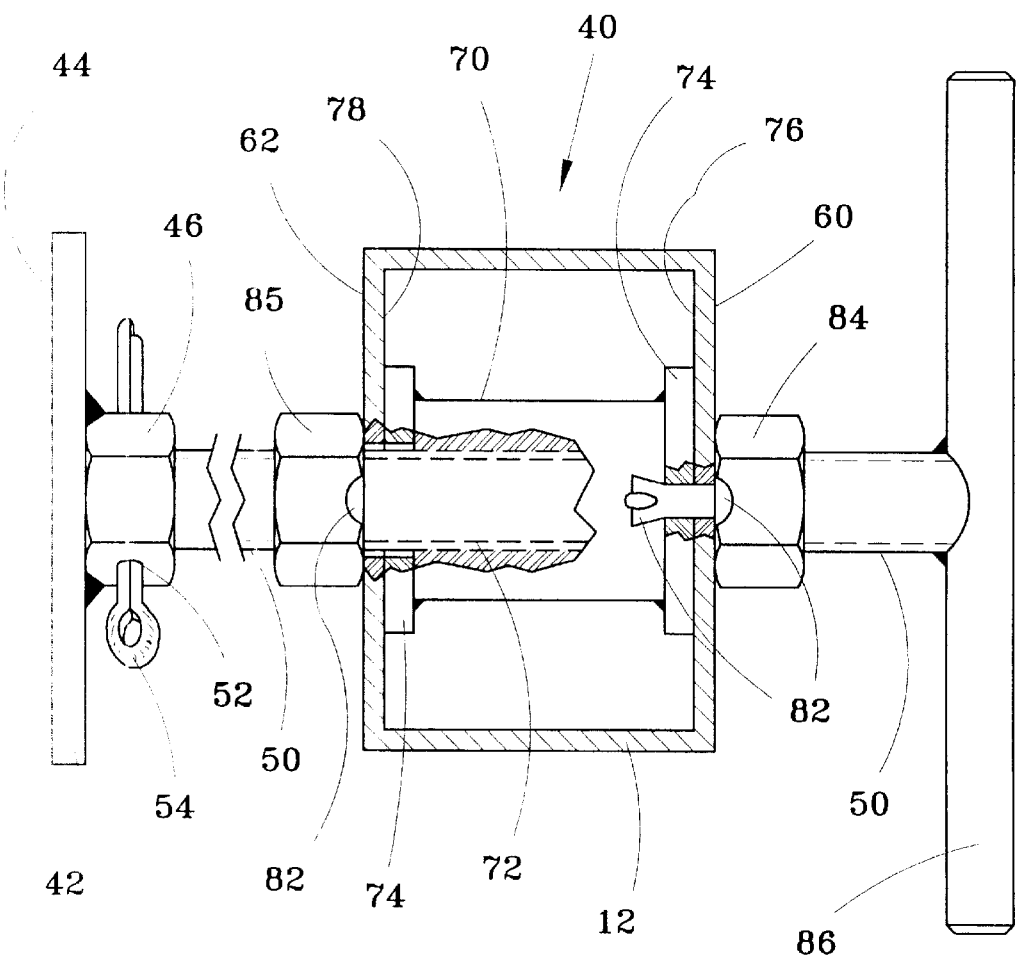
FIG. 2 is a cross-sectional view of a retention bar having an adjustable brace along the line 2—2 of FIG. 1, shown partially broken away.

With reference to FIGS. 1 and 2, an adjustable cargo brace assembly 40 mounted on a retention bar 12 is shown. The adjustable cargo brace assembly 40 has a plate 42 with a surface 44 for contacting and securing cargo 10. The plate 42 can be made of many materials, but preferably is formed from metal such as cold rolled steel. Permanently attached to the plate 42, by welding or any other known means of joining components, is a nut 46 sized to accommodate a threaded rod 50. The rod 50 is screwed into the nut 46. To further insure that the nut 46 does not become unscrewed from the rod 50, a hole 5P may be drilled through the nut 46 and rod 50. A pin 54, preferably a cotter pin, is then inserted through the hole 52 to further retain the nut 46 on the rod 50.

A set screw inserted through a hole drilled in one side of the nut 46 may be used with equivalent results.

The retention bar 12 has a hole drilled through a front 60 of the bar 12 and a corresponding hole drilled through a back 62 of the bar 12 to define a passageway 56. The brace assembly 40 is also provided with an I-shaped support 70 mounted inside the bar 12. The support 70 is made from a tube or collar 72 secured to two end plates 74. The end plates 74 are in turn secured to the internal front 76 and back 78 surfaces of the bar 12 with rivets 82, screws or the like. The support 70 prevents the bar 12 from crushing and helps to guide the rod 50. The support 70 may be mounted in the bar 12 adjacent the rod 50, but is preferably mounted such that a hollow section in the end plates 74 and the collar 72 is aligned with the passageway 56. This preferred arrangement allows the rod 50 to extend through the passageway 56 and the hollow section in the support 70. The interior surface of the hollow section of the collar 72 is preferably threaded so as to threadably engage the threads of the rod 50.

The threaded rod 50 is retained in place by a first stop nut 84 and a second stop nut 85 as shown in FIG. 2. As shown in FIG. 1, the stop nuts 84, 85 may be backed away from their respective sides 60, 62 of the bar 12 so that the horizontal adjustment of the brace assembly 40 may be made. Once the brace assembly 40 is properly positioned, the stop nuts 84, 85 can be tightened against the bar 12 to prevent the movement of the brace assembly 40. The threaded rod 50 can be of any length to secure any load distribution.

Engagement between the rod 50 and the collar 72 provides a means to screw tighten the surface 44 against the load 10. For this purpose, the rod 50 is provided with a handle 86 permanently attached to the rod 50. If desired, however, the handle 86 may be removably attached to the rod 50.

The present invention also contemplates a method for attaching the adjustable brace assembly 40 on a prefabricated retention bar 12 having bar end assemblies 14. The method includes removing at least one of the bar end assemblies 14 by extracting the pin, screw or bolt 22 that retains the bar end assembly 14 in the bar 12 and the channel assembly 20 out of the bar 12. The method also includes drilling a series of holes in the bar 12. More specifically, the holes include a first set of holes to define a passageway for the rod 50 and a second set of holes to accommodate the rivets 82, or screws, used to secure the support 70 in the bar 12. The support maybe welded in place, thus eliminating the need for the later set of holes. Once the holes are drilled, the support 70 is secured to the bar 12. Separately, the handle 86 and the first stop nut 84 are placed on the rod 50. The rod 50 is then inserted through the bar 12 and support 70 so as to extend through the back 62 of the bar 12. The second stop nut 85 and the nut 46 are then placed on the rod 50 as previously discussed. Finally, the removed bar end assembly 14 (or assemblies) is resecured to the bar 12 by sliding the channel assembly 20 back into the bar 12 and securing the channel assembly 20 with the pin 22 or screw that was originally extracted.

More than one brace assembly 40 may be placed on a bar 12. FIG. 1, for example, shows two brace assemblies 40 on the bar 12. Typical bars 12 range from 70 to 102 inches long. It has been found that placing the brace assemblies 40 twenty-two inches in from the ends of the bar is an arrangement that supports may irregular and unevenly distributed loads. Naturally, it is contemplated that the number and spacing of the brace assemblies along the length of the bar may vary, as desired or necessitated by the goods being shipped.

Although particular embodiments of the invention have been described in detail, it is understood that the invention is not limited correspondingly in scope, but includes all changes and modifications coming within the spirit and terms of the claims appended hereto.

What is claimed is:

1. An adjustable cargo retention bar assembly, comprising:

a rigid, hollow, beam having first and second ends and a length direction, said beam defining a passageway that extends transverse to the length direction;

a threaded rod having a cargo securing surface, said rod being inserted through the passageway and cooperating with the beam so that movement of the rod with respect to the beam is restricted, the securing surface being positioned and adapted to contact a cargo load and restrict movement of the cargo load; and a support defining a passageway and being disposed in the hollow of the beam, wherein the support passageway is aligned with the passageway in the beam and the rod extends through the support passageway and the beam passageway and generally transverse to the length direction of the beam, said rod threadably engaging the support.

2. An adjustable cargo retention bar assembly, comprising:

a rigid beam having first and second ends and a length direction, said beam defining a passageway that extends transverse to the length direction;

a threaded rod inserted through said passageway, said rod being provided with stop nuts to engage opposite exterior side surfaces of the beam so that movement of the rod with respect to the beam is restricted, an end of the rod having a cargo securing surface adapted to contact and restrict movement of a cargo load; and a handle secured to a second end of the rod.

3. The retention bar assembly according to claim 2, wherein the beam is hollow.

4. An adjustable cargo retention bar assembly, comprising:

a rigid, hollow beam, the beam defining a passageway;

a threaded rod inserted through said passageway, the rod provided with stop nuts to engage opposite exterior side surfaces of the beam so that movement of the rod with respect to the beam is restricted, and an end of the rod having a cargo securing surface adapted to contact and restrict movement of a cargo load; and, a support, the support defining a passageway and the support being disposed in the hollow of the beam, wherein the support passageway is aligned with the passageway in the beam to allow the rod to extend through the support and the beam passageways.

5. The retention bar assembly according to claim 4, wherein the rod and the support threadably engage each other.

6. An adjustable cargo retention bar assembly, comprising:

a rigid, hollow, beam having first and second ends and a length direction, said beam defining a passageway that extends transverse to the length direction; and a threaded rod inserted through said passageway, said rod being provided with stop nuts to engage opposite exterior side surfaces of the beam so that movement of the rod with respect to the beam is restricted, an end of the rod having a cargo securing surface adapted to contact and restrict movement of a cargo load.

* * * * *